United States Patent
Seo et al.

(10) Patent No.: US 11,005,610 B2
(45) Date of Patent: *May 11, 2021

(54) METHOD FOR SETTING STARTING POSITION OF DATA CHANNEL IN WIRELESS COMMUNICATION SYSTEM AND DEVICE USING METHOD

(71) Applicant: LG ELECTRONICS INC., Seoul (KR)

(72) Inventors: Dong Youn Seo, Anyang-si (KR); Suck Chel Yang, Anyang-si (KR); Joon Kui Ahn, Anyang-si (KR)

(73) Assignee: LG Electronics Inc., Seoul (KR)

( * ) Notice: Subject to any disclaimer, the term of this patent is extended or adjusted under 35 U.S.C. 154(b) by 8 days.

This patent is subject to a terminal disclaimer.

(21) Appl. No.: 15/793,657

(22) Filed: Oct. 25, 2017

(65) Prior Publication Data

US 2018/0048437 A1 Feb. 15, 2018

Related U.S. Application Data

(63) Continuation of application No. 14/350,530, filed as application No. PCT/KR2012/008172 on Oct. 9, 2012, now Pat. No. 9,831,989.

(Continued)

(51) Int. Cl.
*H04L 5/00* (2006.01)
*H04W 72/12* (2009.01)
*H04B 7/26* (2006.01)

(52) U.S. Cl.
CPC .......... *H04L 5/0007* (2013.01); *H04L 5/0094* (2013.01); *H04W 72/1289* (2013.01);
(Continued)

(58) Field of Classification Search
CPC ..... H04L 5/0007; H04L 5/0094; H04L 5/001; H04L 5/0053; H04L 5/0055; H04W 72/1289; H04B 7/2656
See application file for complete search history.

(56) References Cited

U.S. PATENT DOCUMENTS

| 8,369,280 B2 * | 2/2013 | Dinan ............... H04L 1/00 370/330 |
| 8,594,010 B2 * | 11/2013 | Chen ............... H04B 7/2606 370/315 |

(Continued)

FOREIGN PATENT DOCUMENTS

| CN | 101572592 A | 11/2009 |
| CN | 101789823 A | 7/2010 |

(Continued)

OTHER PUBLICATIONS

Nokia Siemens Networks, Nokia: "PCFICH Issues with Cross-Component Carrier Scheduling", 3GPP TSG RAN WG1 Meeting #61, R1-102932, May 10-14, 2010.

(Continued)

*Primary Examiner* — Kibrom T Hailu
*Assistant Examiner* — Bailor C. Hsu
(74) *Attorney, Agent, or Firm* — Dentons US LLP

(57) ABSTRACT

Provided are a method for setting a starting position in a time domain of a data channel in a wireless communication system and a device using the method thereof. The method comprises the steps of: receiving position information notifying the position at which data channels start in a plurality of subframes; receiving a control channel in a first downlink subframe; and receiving at least one data channel scheduled by the control channel in the plurality of the downlink subframes, wherein the position at which the data channel (Continued)

starts in the plurality of the downlink subframes is determined on the basis of the position information.

6 Claims, 11 Drawing Sheets

Related U.S. Application Data

(60) Provisional application No. 61/545,194, filed on Oct. 9, 2011.

(52) U.S. Cl.
CPC ............ *H04B 7/2656* (2013.01); *H04L 5/001* (2013.01); *H04L 5/0053* (2013.01); *H04L 5/0055* (2013.01)

(56) References Cited

U.S. PATENT DOCUMENTS

| | | | | |
|---|---|---|---|---|
| 8,625,509 | B2* | 1/2014 | Ahn | H04L 5/0016 370/208 |
| 8,767,611 | B2* | 7/2014 | Bi | H04L 5/0053 370/252 |
| 8,948,092 | B2* | 2/2015 | Heo | H04L 1/0039 370/329 |
| 2008/0159323 | A1* | 7/2008 | Rinne | H04L 1/0004 370/431 |
| 2009/0046645 | A1 | 2/2009 | Bertrand et al. | |
| 2010/0118807 | A1 | 5/2010 | Seo et al. | |
| 2010/0254268 | A1 | 10/2010 | Kim et al. | |
| 2011/0051681 | A1* | 3/2011 | Ahn | H04W 72/04 370/330 |
| 2011/0064037 | A1* | 3/2011 | Wei | H04L 5/0035 370/329 |
| 2011/0134774 | A1* | 6/2011 | Pelletier | H04L 5/001 370/252 |
| 2011/0170496 | A1* | 7/2011 | Fong | H04L 5/0053 370/329 |
| 2011/0243066 | A1 | 10/2011 | Nayeb Nazar | H04L 1/007 370/328 |
| 2011/0273994 | A1 | 11/2011 | Lin | H04L 5/001 370/241 |
| 2012/0076043 | A1* | 3/2012 | Nishio | H04L 1/1861 370/252 |
| 2013/0003672 | A1* | 1/2013 | Dinan | H04L 1/00 370/329 |
| 2013/0039254 | A1* | 2/2013 | Kim | H04W 72/0426 370/312 |
| 2013/0051342 | A1 | 2/2013 | Aiba | H04L 1/1893 370/329 |
| 2013/0051344 | A1 | 2/2013 | Miki | H04L 1/1861 370/329 |
| 2013/0153298 | A1 | 6/2013 | Pietraski | H04L 5/001 175/45 |
| 2013/0176952 | A1* | 7/2013 | Shin | H04W 72/042 370/329 |
| 2014/0044070 | A1* | 2/2014 | Chen | H04L 43/50 370/329 |
| 2014/0098754 | A1 | 4/2014 | Luo | H04L 5/0053 370/329 |
| 2014/0126531 | A1 | 5/2014 | Kang | H04L 5/0053 370/330 |
| 2014/0133346 | A1 | 5/2014 | Kang | H04W 24/10 370/252 |
| 2014/0153539 | A1* | 6/2014 | Seo | H04L 5/0044 370/330 |
| 2015/0208392 | A1* | 7/2015 | Park | H04B 7/024 370/329 |
| 2015/0257130 | A1 | 9/2015 | Lee | H04W 72/042 370/336 |

FOREIGN PATENT DOCUMENTS

| | | |
|---|---|---|
| CN | 102036297 A | 4/2011 |
| KR | 1020110020708 A | 3/2011 |
| WO | 2011083983 A2 | 7/2011 |
| WO | 2011103483 A1 | 8/2011 |

OTHER PUBLICATIONS

LG Electronics Inc.: "PDSCH Staring Symbol Indication for Cross-Carrier Scheduling", R1-102707, TSG-RAN WG1 Meeting #61, Montreal, Canada, May 10-14, 2010.

HTC: "Indication of starting symbol in PDSCH in a cross-scheduled carrier", 3GPP TSG-RAN WG1 #61, R1-102979, May 10-14, 2010.

NTT DOCOMO: "On RRC Signaling of PDSCH Starting Position", 3GPP TSG RAN WG1 Meeting #61bis, R1-104011, Jun. 28-Jul. 2, 2010.

LG Electronics Inc., "PDSCH Starting Symbol Indication for Cross-Carrier Scheduling", 3GPP-TSG-RAN WG1, Meeting #61, R1-102707, May 10-14, 2010, Montreal, Canada.

* cited by examiner

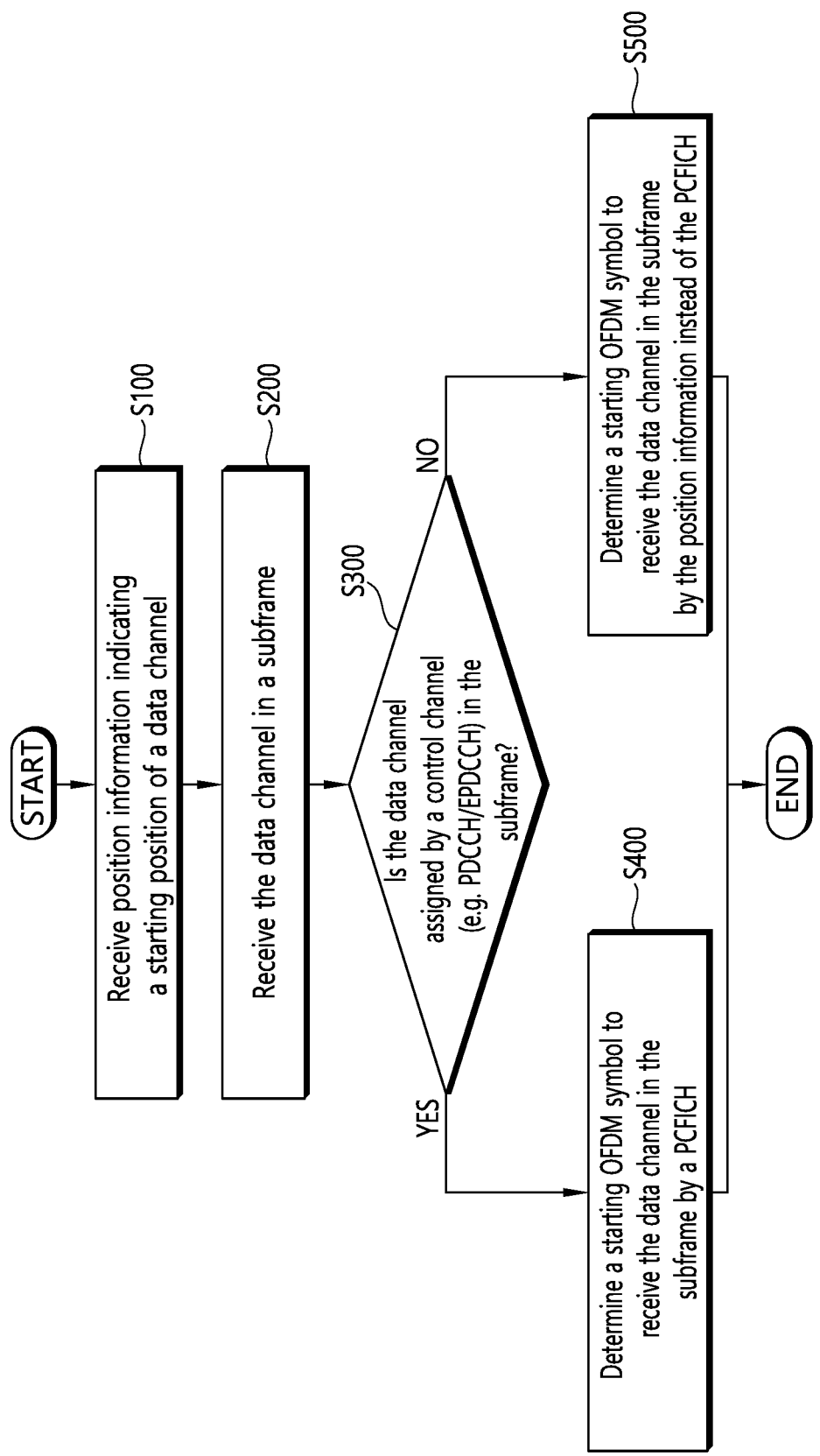

METHOD FOR SETTING STARTING POSITION OF DATA CHANNEL IN WIRELESS COMMUNICATION SYSTEM AND DEVICE USING METHOD

CROSS-REFERENCE TO RELATED APPLICATIONS

This application is a Continuation application of U.S. patent application Ser. No. 14/350,530 filed Apr. 8, 2014, which is a National Stage Application of International Application No. PCT/KR2012/008172 filed Oct. 9, 2012, which claims priority to U.S. Provisional Application No. 61/545,194 filed Oct. 9, 2011, all of which are incorporated by reference for all purposes as if fully set forth herein.

BACKGROUND OF THE INVENTION

Field of the Invention

The present invention relates to wireless communication and more particularly, a method for setting a starting position of a data channel in a wireless communication system and apparatus using the method.

Related Art

A wireless communication system is capable of transmitting a control and a data channel simultaneously within one time interval, for example, one subframe, which is a scheduling unit. The control channel transmits control information, which includes a physical downlink control channel (PDCCH) transmitting downlink scheduling information and uplink scheduling information. The data channel transmits control information and/or data, which includes a Physical Downlink Shared Channel (PDSCH) and a Physical Uplink Shared Channel (PUSCH).

The amount of radio resources occupied by the control channel and that occupied by the data channel can be varied for each subframe. It is common in the Long Term Evolution (LTE) system that the area in the time domain occupied by the control channel is figured out through a Physical Control Format Indication Channel (PCFICH), and a terminal considers an area within a subframe excluding the area occupied by the control channel as the area occupied by the data channel.

Meanwhile, in a wireless communication system, a data channel located in one time interval (for example, a subframe) can be scheduled through one control channel, or a data channel spanning a plurality of time intervals can be scheduled through one control channel. In the latter case, for example, a control channel transmitted at a subframe n can include scheduling information for scheduling data channels spanning subframes n to n+m (where m is a natural number larger than 1).

In this case, a terminal attempts to figure out a starting position of a data channel of each subframe by decoding a total of m+1 PCFICHs from subframes n to n+m. If a decoding error occurs in any one of the m+1 PCFICHs, however, the starting position of the data channel in the corresponding subframe will be incorrectly identified, and as a result, all of the data from the subframes n to n+m may not be decoded properly.

SUMMARY OF THE INVENTION

The present invention has been made in an effort to provide a method for setting a starting position of a data channel in a wireless communication system and an apparatus using the method.

According to one aspect of the present invention, a method for setting a starting position of a data channel in the time domain is provided in a wireless communication system. The method comprises receiving position information informing of starting positions of data channels in a plurality of subframes; receiving a control channel from a first downlink subframe; and receiving at least one data channel scheduled by the control channel from the plurality of downlink subframes, where starting positions of data channels in the plurality of downlink subframes are determined on the basis of the position information.

A User Equipment (UE) according to another aspect of the present invention comprises a Radio Frequency (RF) unit transmitting and receiving radio signals; and a processor connected to the RF unit, where the processor receives position information informing of starting positions of data channels in a plurality of subframes, receives a control channel from a first downlink subframe, and receives at least one data channel scheduled by the control channel from the plurality of downlink subframes; and starting positions of data channels in the plurality of downlink subframes are determined on the basis of the position information.

According to the present invention, starting positions of data channels can be set correctly even when data channels located in a plurality of time intervals are scheduled through one control channel. Therefore, a wireless communication system can select a scheduling method appropriate for an immediate situation and reduce the possibility of occurrence of error, thereby improving system efficiency.

BRIEF DESCRIPTION OF THE DRAWINGS

FIG. 11 is a diagram illustrating an example of a method of determining, by a user equipment, a starting position of a data channel in accordance with one embodiment of the present invention.

DESCRIPTION OF EXEMPLARY EMBODIMENTS

The 3GPP (3rd Generation Partnership Project) LTE (Long Term Evolution) specifications form part of the E-UMTS (Evolved UMTS) employing the Evolved-UMTS Terrestrial Radio Access (E-UTRA), employing Orthogonal Frequency Division Multiple Access (OFDMA) for downlink transmission while Single Carrier-Frequency Division Multiple Access (SC-FDMA) for uplink transmission. The LTE-Advanced (LTE-A) is the advanced form of the 3GPP LTE. To clarify descriptions below, this document concentrates on the 3GPP LTE/LTE-A technology; however, the technical principles of the present invention are not limited to the technology above.

A wireless communication system includes at least one Base Station (BS). Each base station provides a communication service covering a particular geographic region. A geographic region can be again divided into a plurality of sub-regions. A base station usually denotes a fixed station communicating with terminals and can be called in various ways such as an evolved NodeB (eNB), Base Transceiver System (BTS), access point, and Access Network (AN).

A UE may be fixed or mobile and can be called in various ways such as a Mobile Station (MS), User Terminal (UT), Subscriber Station (SS), wireless device, Personal Digital Assistance (PDA), wireless modem, handheld device, and Access Terminal (AT).

Hereinafter, the downlink implies communication from the BS to the UE, and the uplink implies communication from the UE to the BS.

A wireless communication system can correspond to a system supporting two-way communication. Two-way communication can be carried out by employing a Time Division Duplex (TDD) mode, Frequency Division Duplex (FDD) mode, and so on. TDD mode uses different time resources for uplink and downlink transmission respectively. FDD mode uses different frequency resources for uplink and downlink transmission respectively. A base station and UEs can communicate with each other by using radio resources called radio frames.

Figure 1:
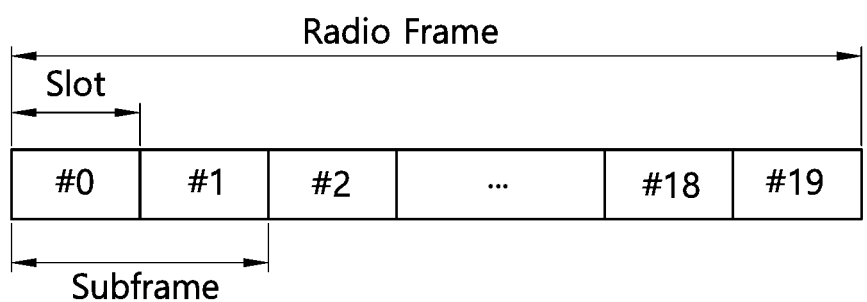
FIG. 1 illustrates a structure of a radio frame.

FIG. 1 illustrates a structure of a radio frame.

With reference to FIG. 1, a radio frame (it can be called a frame for short) comprises 10 subframes in the time domain, and one subframe consists of two slots in the time domain. Length of one subframe can amount to 1 ms, and length of one slot can be 0.5 ms. Time required to transmit one subframe is called a Transmission Time Interval (TTI). A TTI can be the minimum unit for scheduling.

A single slot can include a plurality of Orthogonal Frequency Division Multiplexing (OFDM) symbols in the time domain. Since the 3GPP LTE uses OFDMA for downlink transmission, one symbol period is represented by an OFDM symbol. The OFDM symbol can be called in other ways according to a multiple access method. For example, if SC-FDMA is employed for a uplink multiple-access method, the OFDM symbol can be called an SC-FDMA symbol. Although this document assumes that a single slot contains 7 OFDM symbols, the number of OFDM symbols included in one slot can be varied according to the length of a Cyclic Prefix (CP). According to the 3GPP TS 36.211 V8.5.0 (2008-12), one subframe comprises 7 OFDM symbols in the case of normal CP while one subframe comprises 6 OFDM symbols in the case of extended CP. The structure of a radio frame above is only an example, and the number of subframes included in a radio frame and the number of slots included in a subframe can be changed in various ways.

Figure 2:
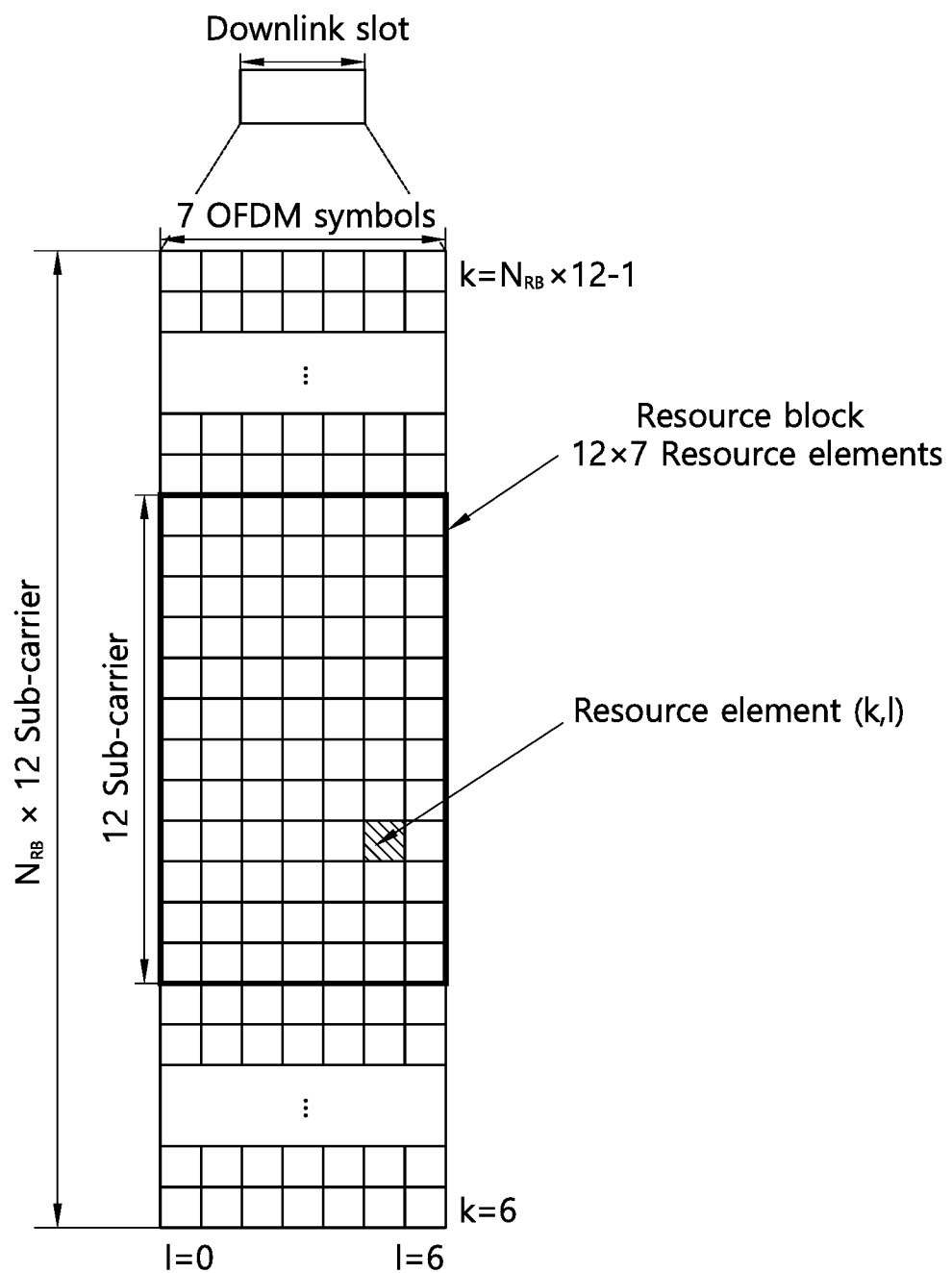
FIG. 2 illustrates one example of a resource grid about one downlink slot.

FIG. 2 illustrates one example of a resource grid about one downlink slot.

With reference to FIG. 2, a downlink slot includes a plurality of OFDM symbols in the time domain and includes $N_{RB}$ Resource Blocks (RBs) in the frequency domain. A resource block, which is a unit of resource allocation, includes one slot in the time domain and a plurality of consecutive subcarriers in the frequency domain. The number of resource blocks $N_{RB}$ included in a downlink slot belongs to the downlink transmission bandwidth defined in a cell. For example, in the LTE system, $N_{RB}$ may correspond to one of numbers ranging from 6 to 110. The structure of a uplink slot can be the same as that of the downlink slot.

Each element of a resource grid is called a resource element. A resource element in a resource grid can be identified by an index pair (k, l) within a slot. Here, k (k=0, . . . , $N_{RB}$×12−1) stands for a subcarrier index of the frequency domain while l (l=0, . . . , 6) an OFDM symbol index of the time domain.

Although it was assumed in FIG. 2 that a resource block includes 7 OFDM symbols in the time domain and 7×12 resource elements consisting of 12 subcarriers in the frequency domain, the number of OFDM symbols within a resource block and the number of subcarriers are not limited to the above example. The number of OFDM symbols and the number of subcarriers may be changed in various ways depending on the length of CP, frequency spacing, and the like. The number of subcarriers for a single OFDM symbol may assume one of 128, 256, 512, 1024, 1536, and 2048.

Figure 3:
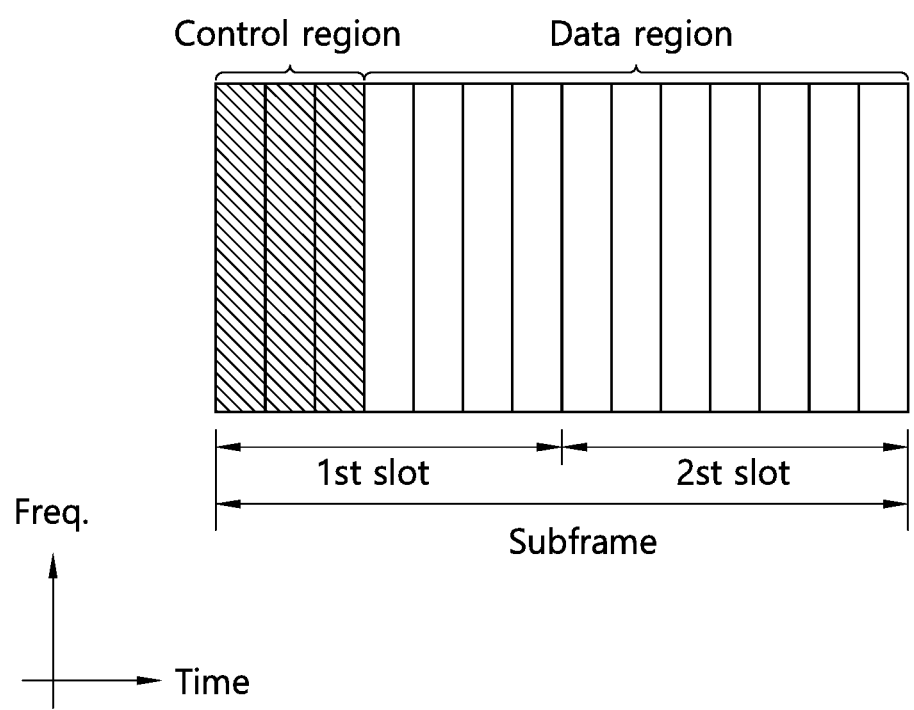
FIG. 3 illustrates an example of the existing downlink subframe structure.

FIG. 3 illustrates an example of the existing downlink subframe structure.

A subframe includes two consecutive slots. A maximum of three preceding OFDM symbols (a maximum of four OFDM symbols depending on a frequency band) of a first slot within a downlink subframe corresponds to a control region to which a control channel is allocated while the remaining OFDM symbols correspond to a data region to which a data channel is allocated. At this time, that a control region includes three OFDM symbols is just an example.

Control channels such as a Physical Downlink Control Channel (PDCCH), Physical Control Format Indicator Channel (PCFICH), and Physical Hybrid ARQ Indicator Channel (PHICH) can be allocated to the control region. A UE can read data transmitted through a data channel by decoding control information transmitted through the PDCCH. The number of OFDM symbols included in the control region within a subframe can be known through the PCFICH. The PHICH carries a Hybrid Automatic Repeat reQuest (HARQ) Acknowledgement (ACK)/Non-acknowledgement (NACK) signal in response to uplink transmission.

A Physical Downlink Shared Channel (PDSCH) can be allocated to the data region. In what follows, a radio resource region to which a particular channel is transmitted can be called a particular channel region. For example, the region to which the PDCCH is transmitted can be called a PDCCH region, and the region to which the PDSCH is transmitted can be called a PDSCH region.

[Structure of PDCCH]

The control region comprises a plurality of Control Channel Elements (CCEs), which form a series of logical CCEs. A CCE corresponds to a plurality of Resource Element Group (REG). For example, a CCE can correspond to 9 REGs. An REG is used to define mapping of a control channel into resource elements. For example, one REG can comprise four resource elements. A series of CCEs is a set of the whole CCEs forming a control region within a single subframe.

Within a control region, a plurality of PDCCHs can be transmitted. A PDCCH is transmitted on an aggregation of one or a few consecutive CCEs. According to the number of CCEs which form a CCE aggregation, a format of the PDCCH and the number of available bits for the PDCCH are determined. In what follows, the number of CCEs used for PDCCH transmission is called a CCE aggregation level L. Also, a CCE aggregation level is a CCE unit meant for searching for a PDCCH. The size of a CCE aggregation level is defined by the number neighboring CCEs. For example, a CCE aggregation level can be defined to have 1, 2, 4, or 8 CCEs.

The following table shows examples of a format of the PDCCH and the number of available bits for the PDCCH according to a CCE aggregation level.

TABLE 1

| PDCCH format | CCE aggregation level | Number of REGs | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

The control information transmitted through the PDCCH is called Downlink Control Information (DCI). DCI transmits uplink scheduling information (which is called a UpLink (UL) grant); downlink scheduling information (which is called a DownLink (DL) grant); or uplink power control command, control information for paging, and control information for specifying a random access (RACH) response.

DCI can be transmitted according to a predetermined format, and an intended use of the DCI can be defined by the corresponding DCI format. For example, uses of the respective DCI formats can be listed up as shown in the table below.

TABLE 2

| DCI format | Use |
|---|---|
| DCI format 0 | PUSCH scheduling |
| DCI format 1 | Scheduling of one PDSCH codeword |
| DCI format 1A | Compact scheduling and a random access process of one PDSCH codeword |
| DCI format 1B | Compact scheduling of one PDSCH codeword having precoding information |
| DCI format 1C | Very compact scheduling of one PDSCH codeword |
| DCI format 1D | Compact scheduling of one PDSCH codeword having precoding and power offset information |
| DCI format 2 | PDSCH scheduling of UEs configured for closed loop spatial multiplexing mode |
| DCI format 2A | PDSCH scheduling of UEs configured for open loop spatial multiplexing mode |
| DCI format 3 | Transmission of a TPC command of a PUCCH and PUSCH having two bit power adjustment |
| DCI format 3A | Transmission of a TPC command of a PUCCH and PUSCH having one bit power adjustment |
| DCI format 4 | PUSCH scheduling in one UL cell under multiple antenna transmission mode |

The PDCCH can be generated through the following procedure. A base station adds a Cyclic Redundancy Check (CRC) for error detection to the DCI to be sent to a UE. The CRC is masked with an identifier depending on an owner of the PDCCH or intended use of the PDCCH, which is called a Radio Network Temporary Identifier (RNTI). As for the PDCCH meant for a particular UE, a unique identifier for the UE assigned from the base station, the CRC can be masked with Cell-RNTI (C-RNTI), for example. Similarly, the CRC can be masked with a paging identifier, for example, Paging-RNTI (P-RNTI) in the case of a PDCCH meant for a paging message transmitted through a Paging Channel (PCH). The CRC can be masked with a system information identifier, for example, System Information-RNTI (SI-RNTI) in the case of a PDCCH meant for system information transmitted through a Downlink Shared Channel (DL-SCH). The CRC can be masked with a Random Access-RNTI (RA-RNTI) in the case of a PDCCH meant for designating a random access response in response to transmission of a random access preamble of the UE. If a C-RNTI is used, the PDCCH carries control information for the corresponding particular UE while, if a different RNTI is used, the PDCCH carries common control information received by all of the UEs within a cell.

Next, the base station generates coded data by carrying out channel coding on the control information to which the CRC pattern has been added. And the base station carries out rate matching according to a CCE aggregation level assigned to the PDCCH format. Next, the base station modulates coded data to generate modulation symbols. At this time, the number of modulation symbols constituting one CCE can be varied according to the CCE aggregation level (one from among 1, 2, 4, 8). The modulation symbols are mapped to physical resource elements (namely, CCE to RE mapping is carried out).

In the 3GPP LTE system, the UE uses blind decoding for detection of a PDCCH. Blind decoding carries out demasking of a CRC of a received PDCCH (which is called a candidate PDCCH) with a desired identifier and checks a CRC error to see whether the corresponding PDCCH is a control channel for the UE. The rationale for the UE to carry out blind decoding is that it does not know beforehand at which position within a control region its PDCCH is transmitted based on which CCE aggregation level or which DCI format.

As described in detail above, a plurality of PDCCHs can be transmitted within one subframe, and the UE monitors the plurality of PDCCHs for each subframe. At this time, monitoring refers to the UE's attempt to decode the PDCCH according to the PDCCH format.

The 3GPP LTE system uses a Search Space (SS) to reduce the burden from blind decoding. A search space can be regarded as a monitoring set of a CCE for PDCCH. The UE monitors a PDCCH within the corresponding search space.

A search space is divided into a Common Search Space (CSS) and a UE-specific Search Space (USS or SS in a simplified notation). A CSS is a space in which a search for PDCCH having common control information is carried out, which can comprise 16 CCEs with CCE indices ranging from 0 to 15 and support a PDCCH with a CCE aggregation level of 4 or 8. The CSS is made to be known to all of the UEs inside a cell, and each UE searches the CSS for the DCI format 1A, 1C, 3, and 3A. A PDCCH which carries UE-specific information can also be transmitted to the CSS.

A USS is defined for each UE and supports a PDCCH having a CCE aggregation level of {1, 2, 4, 8}. The UE is not required to search for all of the defined DCI formats simultaneously. This is intended to reduce the number of attempts for blind decoding. The UE always searches for the DCI format 0 and 1A which have the same length with each other in the USS and are distinguished by a 1-bit flag. The UE additionally searches for the DCI format 1, 1B, and 2 according to a current transmission mode. The transmission mode will be described later.

The starting position of a search space is defined differently for the CSS and USS. The starting position of the CSS is fixed regardless of a subframe, but the starting position of the USS can be varied for each subframe, depending on a UE identifier (for example, C-RNTI), CCE aggregation level and/or slot number within a radio frame. In case the starting position of the USS is located in the CSS, the USS and the CSS can overlap with each other.

In a CCE aggregation level L∈{1, 2, 3, 4}, a search space $S^{(L)}_k$ can be defined as a set of candidate PDCCHs. The CCE corresponding to a candidate PDCCH m of the search space $S^{(L)}_k$ is given as follows.

$$L \cdot \{(Y_k+m) \bmod \lfloor N_{CCE,k}/L \rfloor\} + i \quad \text{[Equation. 1]}$$

where i=0, 1, . . . , L-1; m=0, . . . , $M^{(L)}$-1, $N_{CCE,K}$ represents the total number of CCEs that can be used for transmission of a PDCCH within a control region of a subframe k. The control region includes a set of CCEs indexed from 0 to $N_{CCE,K}$. $M^{(L)}$ represents the number of candidate PDCCHs at the CCE aggregation level L in a given search space. In the CSS, $Y_k$ is set to 0 for two aggregation levels, namely L=4 and L=8. In the USS at a CCE aggregation level L, the variable $Y_k$ is defined as follows.

$$Y_k = (A \cdot Y_{k-1}) \bmod D \quad \text{[Equation. 2]}$$

where $Y_{-1}$=nRNTI≠0, A=39827, D=65537, k=floor($n_s$/2), $n_s$ represents a slot number within a radio frame. The floor function floor(x) gives the largest integer less than or equal to x.

The following table represents the number of candidate PDCCHs in a search space.

TABLE 3

| PDCCH format | Number of CCEs | Number of candidate PDCCHs in the CSS | Number of candidate PDCCHs in the USS |
|---|---|---|---|
| 0 | 1 | — | 6 |
| 1 | 2 | — | 6 |
| 2 | 4 | 4 | 2 |
| 3 | 8 | 2 | 2 |

Meanwhile, nine downlink transmission modes can be defined between the base station and the UE. Depending on the downlink transmission mode, the number of codewords or transport blocks (TBs) included in a PDSCH within each subframe can be varied.

Transmission mode 1: mode where no precoding is employed (single antenna port transmission mode)

Transmission mode 2: transmission mode that can be used for two or four antenna ports using Space-Frequency Block Coding (SFBC) (transmission diversity)

Transmission mode 3: open-loop mode capable of rank adaptation based on Rank Indication (RI) feedback (open loop spatial multiplexing). In case the rank is 1, transmission diversity can be applied, and in case the rank is larger than 1, large delay Cyclic Delay Diversity (CDD) can be used.

Transmission mode 4: mode to which precoding feedback supporting dynamic rank adaptation is applied (closed-loop spatial multiplexing).

Transmission mode 5: multi-user MIMO

Transmission mode 6: closed-loop rank 1 precoding

Transmission mode 7: mode in which a UE-specific reference signal is used

Transmission mode 8: dual layer transmission using antenna ports 7 and 8; or signal antenna port transmission using an antenna port 7 or 8.

Transmission mode 9: transmission of a maximum of 8 layers by using antenna ports 7 to 14.

Meanwhile, a wireless communication system can define and use a new control channel within a PDSCH region. The new control channel is called an extended PDCCH or enhanced PDCCH (ePDCCH) for the purposed of convenience.

Figure 4:
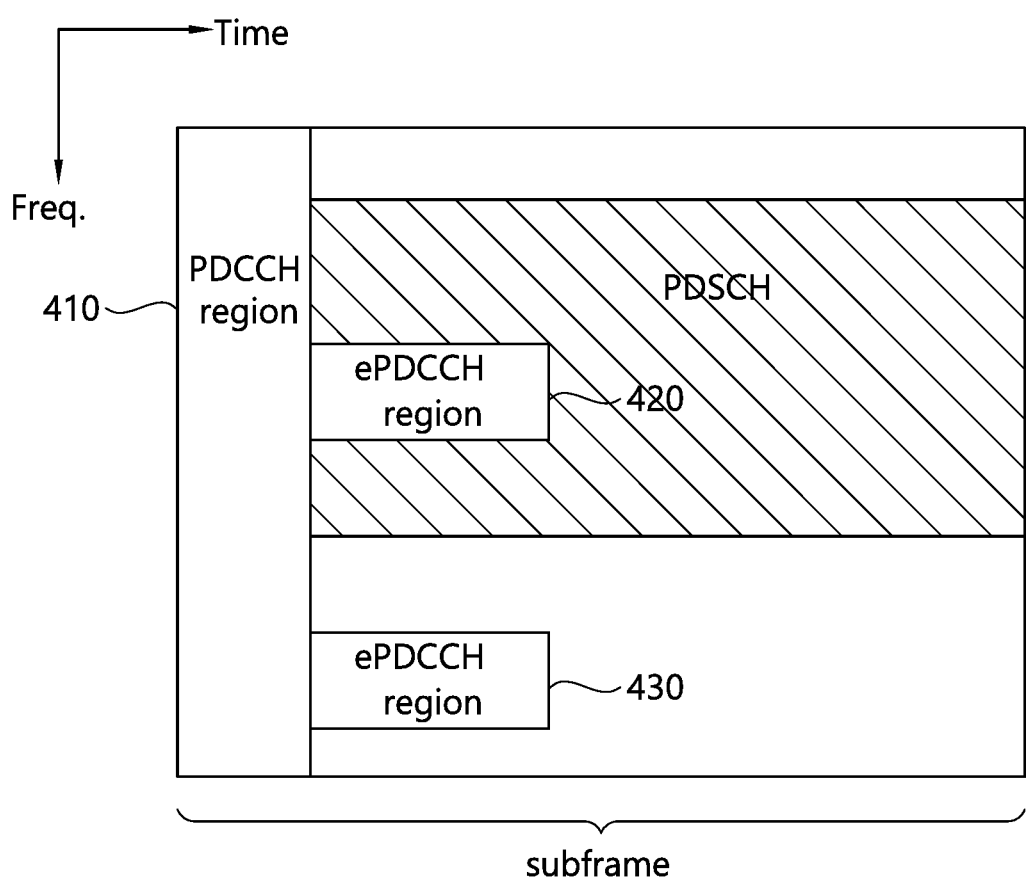
FIG. 4 is one example of a subframe having an ePDCCH.

FIG. 4 is one example of a subframe having an ePDCCH.

The PDCCH carrying various kinds of control information such as DL/UL scheduling in the existing 3GPP LTE/LTE-A system is transmitted only to the control region of a subframe. In this regard, introduction of an ePDCCH which can be scheduled more flexibly is under consideration. The ePDCCH is also called the enhanced PDCCH.

A subframe comprises a PDCCH region 410 for monitoring a PDCCH and one or more ePDCCH regions 420, 430 for monitoring ePDCCHs.

The PDCCH region 410 is located only within a maximum of four preceding OFDM symbols of a subframe whereas the ePDCCH region 420, 430 can be scheduled flexibly within a data region.

In the PDCCH region 410, the PDCCH can be demodulated on the basis of a Cell-specific Reference Signal (CRS). In the ePDCCH region 420, 430, the ePDCCH can be demodulated on the basis of a User equipment-specific Reference Signal (URS). A URS can be transmitted from the corresponding ePDCCH region 420, 430.

A CRS can be received by all of the UEs within a cell, which is a reference signal transmitted throughout the whole downlink bandwidth. An RS sequence $r_{1,n_s}(m)$ for the CRS can be defined as follows.

$$r_{l,n_s}(m) = \frac{1}{\sqrt{2}}(1 - 2 \cdot c(2m)) + j\frac{1}{\sqrt{2}}(1 - 2 \cdot c(2m+1)) \quad \text{[Equation. 3]}$$

where m=0, 1, . . . , $2N_{maxRB}$-1, $N_{maxRB}$ is the maximum number of RBs; ns is the slot number within a radio frame; and l is the OFDM symbol number within the slot.

A pseudo-random sequence c(i) is defined by a Gold sequence of length 31 as shown below.

$$c(n) = (x_1(n+N_C) + x_2(n+N_C)) \bmod 2$$

$$x_1(n+31) = (x_1(n+3) + x_1(n)) \bmod 2$$

$$x_2(n+31) = (x_2(n+3) + x_2(n+2) + x_2(n+1) + x_2(n)) \bmod 2 \quad \text{[Equation. 4]}$$

where Nc=1600 and a first m-sequence is initialized as follows: x1(0)=1, x1(n)=0, m=1, 2, . . . , 30.

A second m-sequence is initialized at the start position of each OFDM symbol so that $c_{init}=2^{10}(7(ns+1)+1+1)(2N^{cell}_{ID}+1)+2N^{cell}_{ID}+N_{CP}$. $N^{cell}$ ID is a Physical Cell Identity (PCI), and in a normal CP, $N_{CP}$=1 while $N_{CP}$=0 in the case of an extended CP.

Although a CRS is transmitted throughout the whole region of a subframe, a URS is transmitted within a data region of the subframe and used for demodulation of the corresponding PDSCH. The URS is also called a Dedicated Reference Signal (DRS).

A URS is transmitted only in an RB to which the corresponding PDSCH is mapped.

The URS is used only by the UE which receives the corresponding PDSCH. An RS sequence $r_{ns}(m)$ for a US is the same as Eq. 3. At this time, m=0, 1, . . . , 12 $N_{PDSCH,RB}$-1 and $N_{PDSCH,RB}$ represents the number of RBs of the corresponding PDSCH transmission. A pseudo random sequence generator is initialized at the starting position of each subframe so that $c_{init}$=(floor(ns/2)+1)(2$N^{cell}_{ID}$+1)$2^{16}$+$n_{RNTI}$. $n_{RNTI}$ is a UE identifier.

The above description is related to the case where a URS is transmitted through a single antenna. When the URS is transmitted through multiple antennas, the pseudo random sequence generator is initialized at the starting position of each subframe so that $c_{init}=(floor(ns/2)+1)(2N^{cell}_{ID}+1)2^{16}+n_{SCID}$. $n_{SCID}$ is a parameter obtained from a DL grant (for example, DCI format 2B or 2C) related to PDSCH transmission.

An ePDCCH can be monitored in the ePDCCH region 420, 430 through blind decoding. Likewise, the ePDCCH may not use blind decoding. The UE, be aware of positions or the number of ePDCCHs within the ePDCCH region 420, 430, can detect the ePDCCH at a predefined position.

One UE, a group of UEs, or UEs within a cell can monitor the ePDCCH region 420, 430. If a particular UE monitors the ePDCCH region 420, 430, $n_{RNTI}$ or $n_{SCID}$, which is used for initialization of the pseudo random sequence generator of the URS, can be obtained on the basis of the identifier of the particular UE. If a group of UEs monitor the ePDCCH region 420, 430, $n_{RNTI}$ or $n_{SCID}$, which is used for initialization of the pseudo random sequence generator of the URS, can be obtained on the basis of the identifier of the corresponding UE group.

When the ePDCCH region 420, 430 is transmitted through multiple antennas, precoding which is the same as the URS can be applied to the ePDCCH region 420, 430.

Since ePDCCH is more flexible than the PDCCH in terms of scheduling, transmission of the ePDCCH region can be considered in the whole of a particular subframe. In a subframe, the PDCCH and the ePDCCH region can be defined at the same time or either of the two regions. The ePDCCH region can be set to a plurality of consecutive subframes or discontinuous subframes. Whether an ePDCCH region is set within a subframe can be indicated through a upper layer signal such as an RRC message or through a DCI within the existing PDCCH region.

Figure 5:
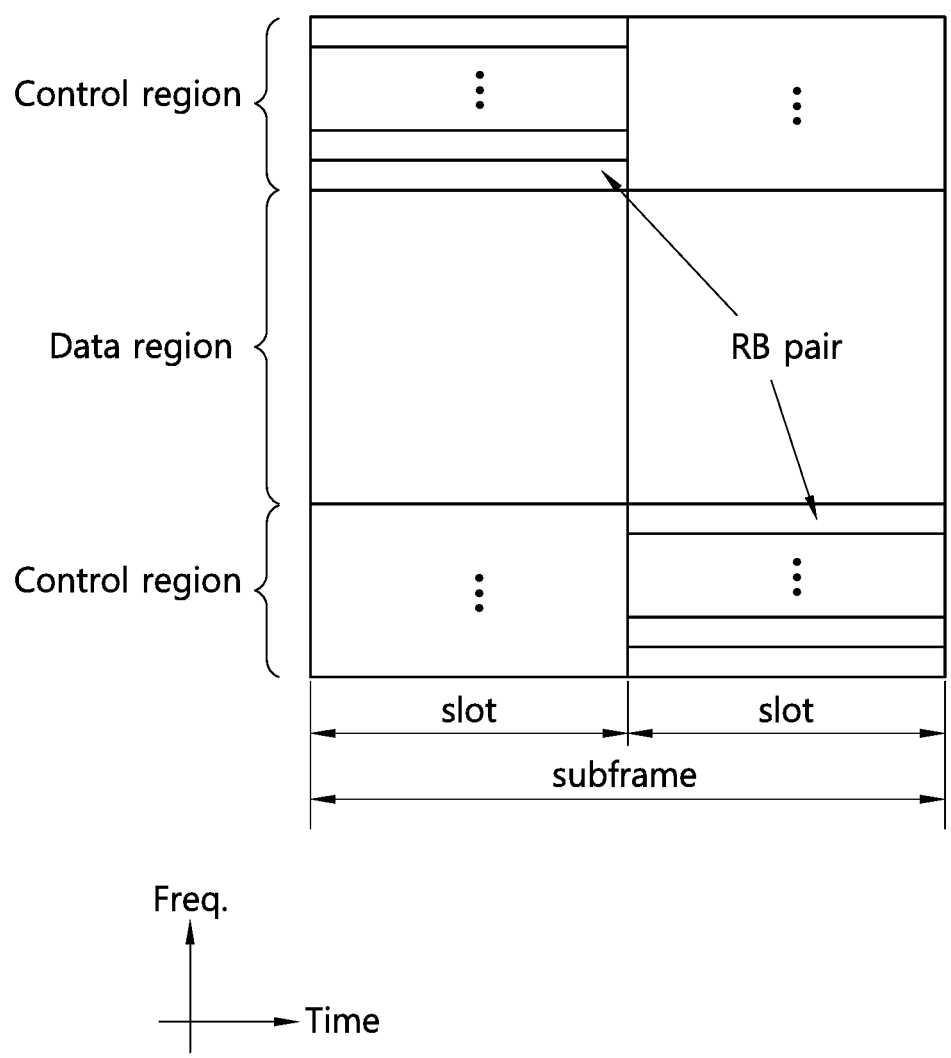
FIG. 5 illustrates a structure of a uplink subframe.

FIG. 5 illustrates a structure of a uplink subframe.

With reference to FIG. 5, a uplink subframe can be divided into a control region and a data region in the frequency domain. In the control region, a Physical Uplink Control Channel (PUCCH) for transmitting uplink control information is allocated. A Physical Uplink Shared Channel (PUSCH) for transmitting data (depending on the needs, control information can also be transmitted) is allocated in the data region. According to a particular configuration, the UE is enabled to transmit the PUCCH and the PUSCH simultaneously or either of the two channels.

A PUCCH is allocated in the form of an RB pair in a subframe of one UE. Resource blocks belonging to an RB pair occupy subcarriers different from each other respectively in a first and a second slot. The frequency band occupied by a resource block belonging to the RB pair allocated to the PUCCH is changed on the basis of a slot boundary. The RB pair allocated to the PUCCH as described above is then said to have frequency-hopped at the slot boundary. Frequency diversity gain can be obtained by transmitting uplink control information through different subcarriers according as time passes.

The PUCCH can transmit a Hybrid Automatic Repeat reQuest (HARM) Acknowledgement (ACK)/Non-acknowledgement (NACK) and Channel Status Information (CSI) indicating downlink channel status such as Channel Quality Indicator (CQI), Precoding Matrix Index (PMI), Precoding Type Indicator (PTI), and Rank Indication (RI). Periodic channel status information can be transmitted through the PUCCH.

The PUSCH is mapped to a Uplink Shared Channel (UL-SCH), which is a transport channel. Uplink data transmitted on the PUSCH may correspond to a transport block, which is a data block meant for a UL-SCH transmitted during a TTI. The transport block can include user data. The uplink data can correspond to multiplexed data. The multiplexed data can be obtained from multiplexing of a transport block for the UL-SCH and channel status information. For example, channel status information multiplexed into data can include CQI, PMI, RI, and so on. Also, the uplink data can comprise only channel status information. Periodic or non-periodic channel status information can be transmitted through the PUSCH.

In a wireless communication system, a UE receives scheduling information such as a DL grant and UL grant through the PDCCH and based on the scheduling information, performs an operation of receiving the PDSCH and transmitting the PUSCH. In general, the DL grant and PDSCH are received within the same subframe. In the case of FDD, the PUSCH is transmitted after four subframes from the subframe which receives the UL grant. Besides such dynamic scheduling, the LTE system provides Semi-Persistent Scheduling (SPS), too.

Downlink or uplink SPS can inform the UE through a upper layer signal such as a Radio Resource Control (RRC) about which subframes perform semi-persistent transmission of PUSCH and reception of PDSCH. A parameter given to the upper layer signal can be the period and offset of a subframe, for example.

After recognizing semi-persistent transmission/reception through the RRC signaling, the UE performs or releases SPS transmission/reception if the UE receives an activation signal or a release signal of SPS transmission through the PDCCH. In other words, if the UE receives an activation signal or release signal through the PDCCH, instead of immediately performing SPS transmission/reception upon receiving SPS through the RRC signaling, the UE performs SPS transmission/reception on a subframe corresponding to the subframe period and offset received through the RRC signaling by applying frequency resources (resource blocks) according to allocation of resource blocks specified by the PDCCH, modulation according to MCS information, and coding rate. If a release signal is received through the PDCCH, the UE stops SPS transmission/reception. If the PDCCH including an activation signal is received again, the stopped SPS transmission/reception is resumed by using frequency resources specified by the corresponding PDCCH, MCS, and so on.

The PDCCH for SPS setting/release can be called an SPS allocation PDCCH while the PDCCH for a conventional PUSCH/PDSCH can be called a dynamic PDCCH. Then the UE can perform validation of whether a PDCCH corresponds to the SPS allocation PDCCH in case the following conditions are all met: 1) CRC parity bits obtained from a PDCCH payload are scrambled into an SPS C-RNTI. 2) And the value of a new data indicator field should be 0. Also, if each field of the PDCCH is set according to a field value in the following table with respect to each DCI format, the UE considers the DCI information of the corresponding PDCCH as SPS activation or release.

TABLE 4

|  | DCI format 0 | DCI format 1/1A | DCI format 2/2A/2B/2C |
|---|---|---|---|
| TPC command for scheduled PUSCH | set to '00' | N/A | N/A |
| Cyclic shift DM RS | set to '000' | N/A | N/A |

TABLE 4-continued

| | DCI format 0 | DCI format 1/1A | DCI format 2/2A/2B/2C |
|---|---|---|---|
| Modulation and coding scheme and redundancy version | MSB is set to '0' | N/A | N/A |
| HARQ process number | N/A | FDD: set to '000' TDD: set to '0000' | FDD: set to '000' TDD: set to '0000' |
| Modulation and coding scheme | N/A | MSB is set to '0' | For the enabled transport block: MSB is set to '0' |
| Redundancy version | N/A | set to '00' | For the enabled transport block: set to '00' |

The Table 4 shows field values of an SPS allocation PDCCH to perform authentication of SPS activation.

TABLE 5

| | DCI format 0 | DCI format 1A |
|---|---|---|
| TPC command for scheduled PUSCH | set to '00' | N/A |
| Cyclic shift DM RS | set to '000' | N/A |
| Modulation and coding scheme and redundancy version | set to '11111' | N/A |
| Resource block assignment and hopping resource allocation | Set to all '1's | N/A |
| HARQ process number | N/A | FDD: set to '000' TDD: set to '0000' |
| Modulation and coding scheme | N/A | set to '11111' |
| Redundancy version | N/A | set to '00' |
| Resource block assignment | N/A | Set to all '1's |

The Table 5 shows field values of an SPS allocation PDCCH to perform authentication of SPS release.

Now, described will be a carrier aggregation system.

[Carrier Aggregation System]

Figure 6:
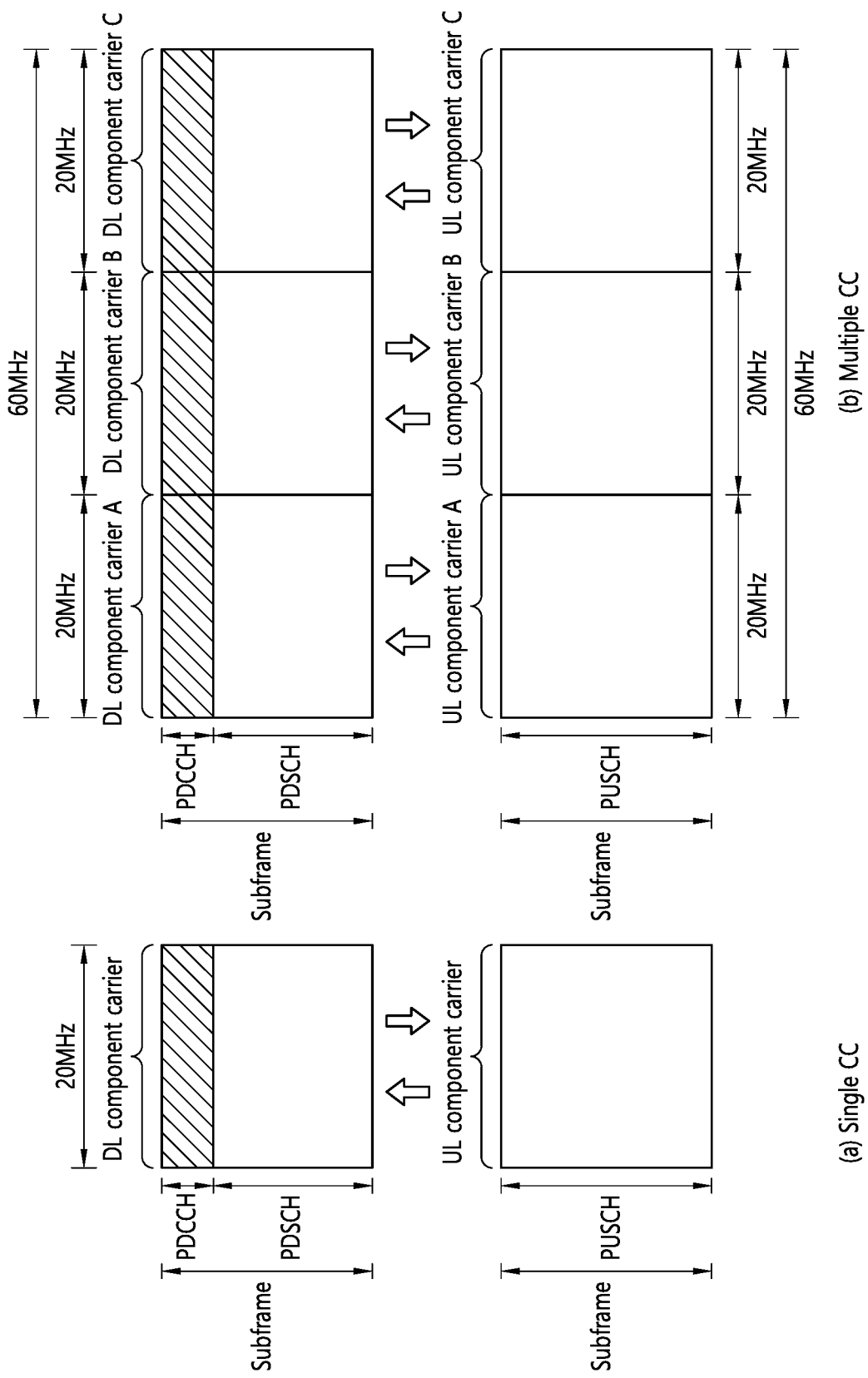
FIG. 6 is a comparison example between the existing single carrier wave system and a carrier aggregation system.

FIG. 6 is a comparison example between the existing single carrier wave system and a carrier aggregation system.

With reference to FIG. 6(a), in a single carrier wave system, only a single carrier (single component carrier (CC)) is supported for uplink and downlink transmission of the UE. Bandwidth of a carrier wave may vary but the number of carriers allocated to the UE is one. On the other hand, in a carrier aggregation (CA) system as shown in FIG. 6(b), a plurality of component carriers (DL CC A to C, UL CC A to C) can be allocated to the UE. A component carrier refers to a carrier wave used in a carrier aggregation system and can be called a carrier for short. For example, three component carriers, each of which having a bandwidth of 20 MHz, can be allocated to provide bandwidth of 60 MHz to the UE.

Carrier aggregation systems can be grouped into contiguous carrier aggregation systems where aggregated carriers are arranged continuously and non-contiguous carrier aggregation systems where aggregated carriers are separated from each other. In what follows, if a system is called simply a carrier aggregation system, it should be understood that the system includes both of the contiguous and non-contiguous component carriers.

When one or more component carriers are aggregated, target component carriers may use the same bandwidth used in the existing system to ensure backward compatibility with the existing system. For example, the 3GPP LTE system supports bandwidth of 1.4 MHz, 3 MHz, 5 MHz, 10 MHz, 15 MHz, and 20 MHz while the 3GPP LTE-A system can establish a broadband beyond 20 MHz by using only the bandwidth used for the 3GPP LTE system. A broadband can be constructed by newly defining frequency bands instead of employing the frequency band used for the existing system.

The system frequency band of a wireless communication system is characterized by a plurality of carrier frequencies. At this time, carrier frequency denotes center frequency of a cell. In what follows, a cell may stand for downlink frequency resources and uplink frequency resources. Also, a cell may denote a combination of downlink frequency resources and optional uplink frequency resources. Also, in case carrier aggregation is not taken into account, one cell can always exist in the form of a pair of uplink and downlink frequency resources.

In order for data transmission and reception to be carried out through a particular cell, the UE first has to complete configuration of the particular cell. At this time, configuration refers to the state where reception of system information required for data transmission and reception with respect to the corresponding cell has been completed. For example, configuration can include the overall procedure for receiving common physical layer parameters required for data transmission and reception, Media Access Control (MAC) layer parameters, or parameters required for a particular operation in the RRC layer. A completely configured cell, once receiving information indicating that packet data can be transmitted, is in a state where transmission and reception of packets can be carried out immediately.

A completely configured cell can be in an activation state or a deactivation state. At this time, activation indicates that transmission or reception of data is being carried out or in a ready state. The UE, to check resources allocated to itself (which can be frequency or time), can monitor or receive the control (PDCCH) and the data channel (PDSCH) of an activated cell.

Deactivation refers to the state where transmission or reception of traffic data is not possible but only measurement or transmission/reception of minimal information is allowed. The UE can receive system information required for packet reception from a deactivated cell. On the other hand, the UE, to check resources allocated to itself (which may be frequency or time), does not monitor or receive the control (PDCCH) and the data channel (PDSCH) of a deactivated cell.

Cells can be divided into primary cells, secondary cells, and serving cells.

A primary cell refers to a cell operating in the primary frequency band, a cell in which the UE performs an initial connection establishment procedure with the base station, a cell in which the UE performs a connection re-establishment procedure, or a cell designated as the primary cell during a handover procedure.

A secondary cell refers to a cell operating in the secondary frequency band, which is configured when an RRC connection is established and used for providing additional radio resources.

A serving cell is composed of primary cells when carrier aggregation is not configured for the UE or when the UE is unable to provide carrier aggregation. In case carrier aggregation is configured, the term of a serving cell represents a cell configured for the UE and can be composed of multiple cells. In the case of FDD, one serving cell can be composed of one downlink component carrier or a pair of downlink component carrier and uplink component carrier. A plurality of serving cells can be composed of a set comprising a primary cell and one or more secondary cells.

A Primary Component Carrier (PCC) refers to a component carrier (CC) corresponding to a primary cell. A PCC is one of CCs, which enables the UE to establish a connection or an RRC connection with the base station at the initial stage. A PCC is a special CC, which takes care of a connection or an RRC connection for signaling a plurality of CCs and manages UE context which is connection information related to the UE. Also, in case the PCC is in an RRC connected mode as the PCC is connected to the UE, the PCC always remains in an activation state. A downlink component carrier corresponding to the primary cell is called a Downlink Primary Component Carrier (DL PCC) while a uplink component carrier corresponding to the primary cell is called a Uplink Primary Component Carrier (UL PCC).

A Secondary Component Carrier (SCC) refers to a CC corresponding to the secondary cell. In other words, An SCC is a CC allocated to the UE in addition to the PCC, which is an extended carrier meant for additional resource allocation by the UE in addition to the PCC and stays in an activation or deactivation state. A downlink component carrier corresponding to the secondary cell is called a Downlink Secondary Component Carrier (DL SCC) while a uplink component carrier corresponding to the secondary cell is called a Uplink Secondary Component (UL SCC).

The primary and secondary cell have the following characteristics.

First, the primary cell is used for transmission of a PUCCH. Second, the primary cell is always activated whereas the secondary cell is activated or deactivated depending on a particular condition. Third, when the primary cell experiences Radio Link Failure (RLF), an RRC re-connection is triggered. Fourth, the primary cell can be changed by change of a security key or a handover procedure accompanying a Random Access CHannel (RACH) procedure. Fifth, Non-Access Stratum (NAS) information is received through the primary cell. Sixth, in the case of a FDD system, the primary cell is always made of a pair of a DL PCC and a UL PCC. Seventh, a different CC can be configured as the primary cell for each UE. Eighth, the primary cell can be replaced only through a handover or cell selection/re-selection procedure. In adding a new secondary cell, RRC signaling can be used for transmitting system information of a dedicated secondary cell.

Regarding CCs constituting a serving cell, a downlink component carrier can constitute one serving cell, or a downlink component carrier and a uplink component carrier are configured to be connected to form one serving cell. However, a single uplink component carrier alone cannot form a serving cell.

Activation/deactivation of a component carrier is the same concept of activation/deactivation of a serving cell. For example, suppose a serving cell 1 is composed of DL CC1. Then, activation of the serving cell 1 implies activation of DL CC1. If it is assumed that a serving cell 2 is composed of DL CC2 and UL CC2 connected to each other, activation of serving cell 2 implies activation of DL CC2 and UL CC2. In this regard, each component carrier can correspond to a serving cell.

The number of component carriers aggregated can be set differently between downlink and uplink transmission. When the number of downlink CCs and the number of uplink CCs are the same to each other, it is called symmetric aggregation. If the two numbers are different from each other, it is called asymmetric aggregation. Also, sizes of CCs (namely, bandwidth) can differ from each other. For example, if five CCs are involved to form a frequency band of 70 MHz, the configuration of CCs can be done like 5 MHz CC (carrier #0)+20 MHz CC (carrier #1)+20 MHz CC (carrier #2)+20 MHz CC (carrier #3)+5 MHz CC (carrier #4).

As described above, different from a single carrier system, a carrier aggregation system can support a plurality of CCs, namely, multiple serving cells.

The carrier aggregation system can support cross-carrier scheduling. Cross-carrier scheduling is one of scheduling methods, which can perform resource allocation of a PDSCH transmitted through a different CC by using a PDCCH transmitted through a particular CC and/or resource allocation of a PUSCH transmitted through a different CC other than a CC linked by default to the particular CC. In other words, a PDCCH and a PDSCH can be transmitted through downlink CCs different from each other, and a PUSCH can be transmitted through a different uplink CC other than a uplink CC linked to a downlink CC to which the PDCCH including a UL grant has been transmitted. As indicated above, a system supporting cross-carrier scheduling requires a carrier indicator indicating a DL CC/UL CC through which the PDSCH/PUSCH receiving control information from the PDCCH is transmitted. In what follows, a field containing such a carrier indicator is called a Carrier Indication Field (CIF). The CIF value of the primary cell can be set to 0.

A carrier aggregation system supporting cross-carrier scheduling can incorporate a CIF into the existing Downlink Control Information (DCI) format. In a system supporting the cross-carrier scheduling, for example, the LTE-A system, since the CIF is added to the existing DCI format (namely, the DCI format used in the LTE system), the DCI format can be extended to include three additional bits. The PDCCH structure can re-use the existing coding method, resource allocation method (namely, resource mapping based on CCE) and so on.

Meanwhile, the base station can specify a PDCCH monitoring DL CC set. The PDCCH monitoring DL CC set comprises part of DL CCs from the whole of aggregated DL CCs; once cross-carrier scheduling is defined, the UE carries out PDCCH monitoring/decoding only for the DL CC included in the PDCCH monitoring DL CC set. In other words, the base station transmits a PDCCH in association with the PDSCH/PUSCH that is scheduled only through the DL CC included in the PDCCH monitoring DL CC set. The PDCCH monitoring DL CC set can be configured in a UE-specific, UE group-specific, or cell specific manner.

Figure 7:
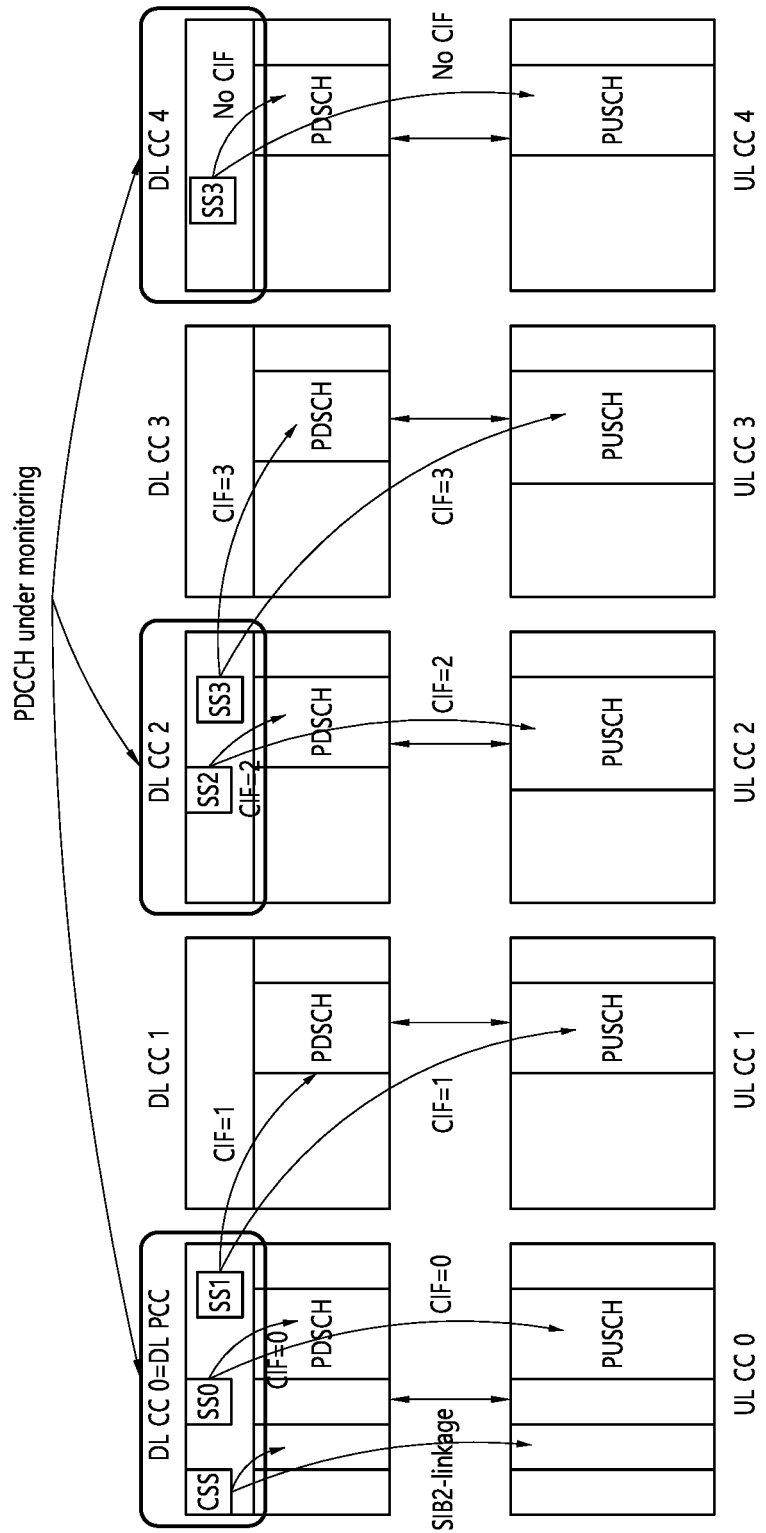
FIG. 7 illustrates a scheduling example when cross carrier scheduling is configured for a carrier aggregation system.

FIG. 7 illustrates a scheduling example when cross carrier scheduling is configured for a carrier aggregation system.

With respect to FIG. 7, DL CC 0, DL CC 2, and DL CC 4 form a PDCCH monitoring DL CC set, by which the UE monitors the PDCCH. The UE searches the CSS of DL CC 0 for the DL grant/UL grant of the DL CC 0 and UL CC 0 (the UL CC linked to the DL CC 0 by SIB2). And the UE searches the UE-specific search space 1 (SS 1) of the DL CC 0 for the DL grant/UL grant of the DL CC 1 and UL CC 1. The SS 1 is one example of the USS. In other words, the SS 1 of the DL CC 0 is a search space in which the UE searches for the DL grant/UL grant carrying out cross carrier scheduling.

Now, the present invention is described.

A wireless communication system can schedule data channels of multiple subframes through one control channel depending on a situation. In what follows, a PDCCH is used to represent the control channel and a PDSCH the data channel, but the present invention is not limited to the aforementioned assumption.

Figure 8:
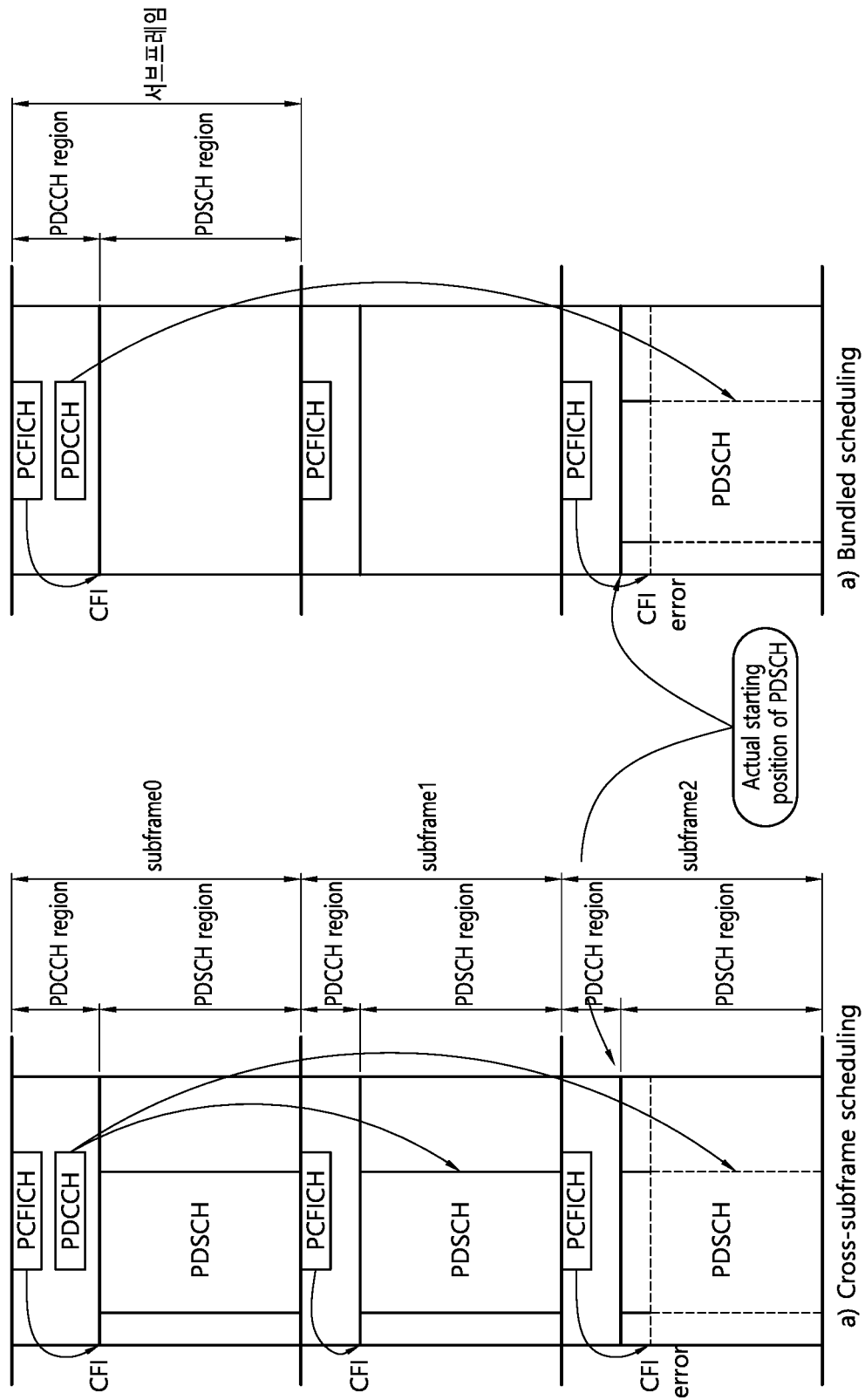
FIG. 8 illustrates a case where data channels located in a plurality of subframes are scheduled by one control channel.

FIG. 8 illustrates a case where data channels located in a plurality of subframes are scheduled by one control channel.

With reference to FIG. 8, PDSCHs located at subframe 0, 1, and 2 are scheduled through the PDCCH transmitted at subframe 0. As described above, scheduling of PDSCHs located at a plurality of subframes through a single PDCCH is called bundled scheduling. Bundled scheduling can also be interpreted such that a PDSCH of a subframe including the PDCCH and that not including the PDCCH are scheduled at the same time through a single PDCCH.

With reference to FIG. 8(b), a PDSCH located at subframe 2 is scheduled through the PDCCH transmitted at subframe 0. As described above, scheduling at least one PDSCH located at a plurality of subframes not including the PDCCH through a single PDCCH is called cross subframe scheduling.

The bundled scheduling and cross subframe scheduling can be used being combined with each other, which is called cross-bundled scheduling.

At the time of applying the bundled scheduling, cross subframe scheduling, or cross-bundled scheduling, the base station informs about the start and the end subframe of such scheduling. Also, the base station can command scheduling by forming a bitmap describing subframes to which the scheduling can be applied.

A conventional UE first detects a PCFICH from each downlink subframe and identifies a PDCCH region. The UE then detects its PDCCH through blind decoding in the identified PDCCH region. If a DL grant is found, the UE decodes the PDSCH within the same subframe according to the DL grant. Similarly, if a UL grant is found, the UE transmits a PUSCH according to the UL grant from the corresponding uplink subframe.

Considering the aforementioned operation of the conventional UE, if a PDCCH which schedules a PDSCH and the PDSCH scheduled by the PDCCH are located in the same subframe (for example, subframe 0 of FIG. 8(a)), a PCFICH is detected. When obtaining an error-free CFI through the PCFICH, the UE detects its PDCCH by identifying the PDCCH region and attempts to receive its PDSCH by considering the remaining region of a subframe excluding the PDCCH region as a PDSCH region.

By the way, there is a chance for an error in detecting the PCFICH, and the UE has no means to recognize the occurrence of the error. This is so because the PCFICH only relies on repetition based on simplex coding without using CRC and provides no other means to detect an error. In this manner, if an error occurs in detecting the PCFICH, the UE becomes unable to detect the PDCCH itself as the CFI is mistaken for a different value.

Meanwhile, if a scheduling PDCCH and a scheduled PDSCH are located in subframes different from each other (however, they can be the same cell), the PCFICH is detected normally in a subframe receiving the PDCCH and the PDCCH is detected. In a subframe receiving the PDSCH, however, there can be a chance that an error is developed for detecting the PCFICH in a subframe receiving the PDSCH and the starting position of the PDSCH is identified wrongly as a wrong CFI value is applied.

In this manner, if the starting position of the PDSCH is wrongly perceived, positions of coded bits mapped to the PDSCH are shifted; at the time of HARQ combining, only the noise is enhanced. Therefore, a problem of degraded data reception performance arises.

The aforementioned problem results from the fact that there is a chance of developing an error for decoding the PCFICH after all. Such an error can occur, for example, when a method for reducing inter-cell interference in units of subframes in a heterogeneous network is used. In other words, in the case of control channels setting high transmission power as required SINR is high, the interference exerted on neighboring cells can be lowered by limiting transmission to transmission in units of subframes. This is so because decoding performance of a control channel in a serving cell can be deteriorated due to variation of transmission power of a control channel in the serving cell according to ABS (Almost Blank Subframe) configuration applied to the serving cell, variation of interference of the serving cell according to the ABS configuration on neighboring cells, and so on. At this time, an ABS subframe denotes a subframe to which only a Common Reference Signal (SRS) is transmitted.

The problem of wrongly recognizing the starting position of the PDSCH region due to the PCFICH decoding error can be resolved through the following methods proposed by the present invention.

In what follows, CFID (CFI for PDSCH) denotes position information for informing of the starting position of the PDSCH. The CFID can directly specify a starting OFDM symbol of the PDSCH. Or the starting position of the PDSCH region can be known indirectly as the number of OFDM symbols in the PDCCH region is informed. Similarly, in case a temporal relationship between the PDCCH region and the PDSCH region is defined beforehand, the last symbol of the PDCCH region can be known.

I. Method 1.

The base station can inform about the starting position of a scheduled PDSCH by informing about the corresponding CFID through a higher layer signal such as an RRC message. In other words, the base station informs about the starting position of the PDSCH in each subframe through an RRC message transmitted through a particular PDSCH rather than inform about the starting position through the PCFICH of the corresponding subframe. This method provides high reliability in a sense that an RRC message can be received again by using HARQ in such a case that the RRC message is not received properly.

Figure 9:
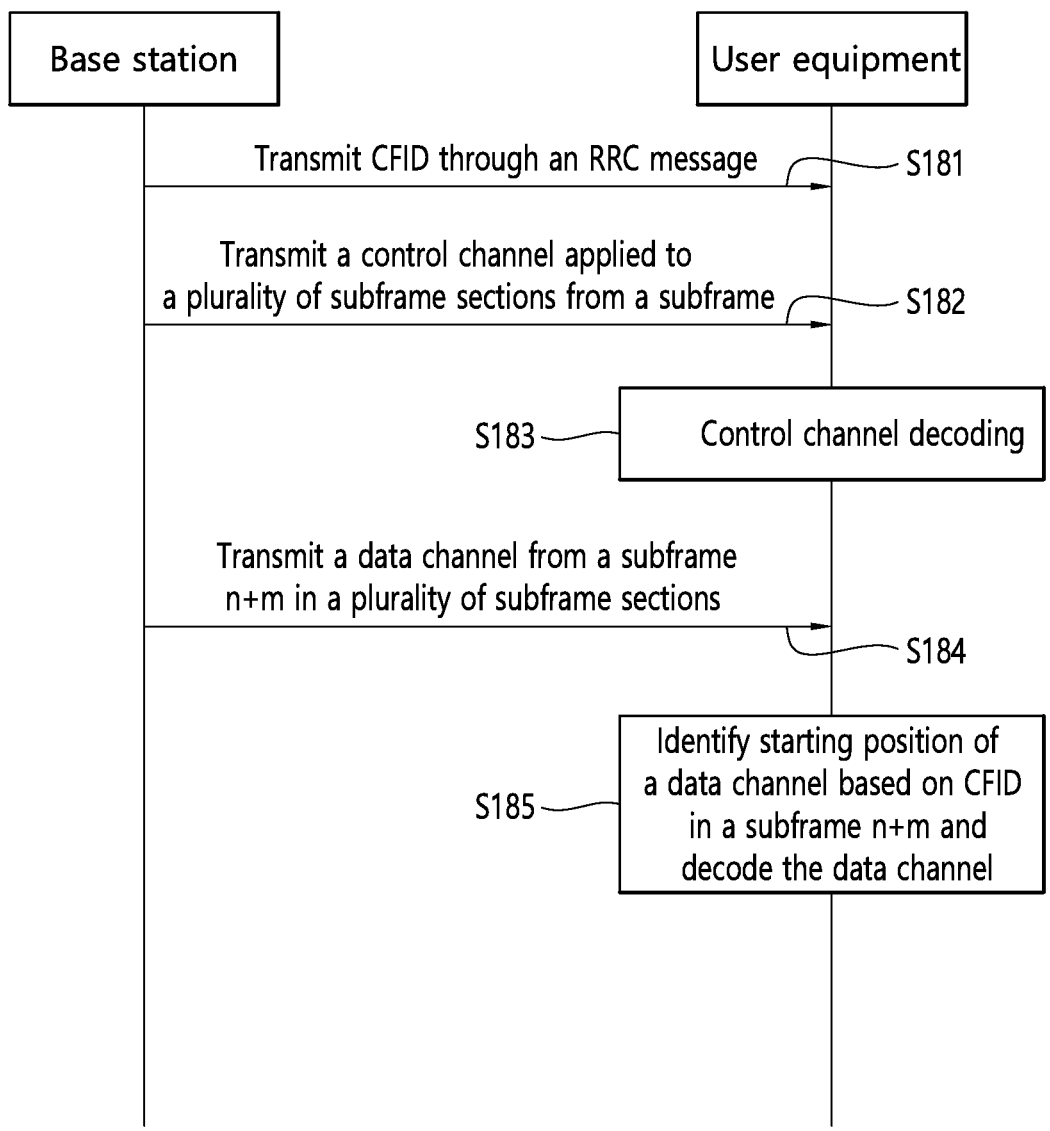
FIG. 9 illustrates one example of applying the method 1.

FIG. 9 illustrates one example of applying the method 1.

The base station provides a CFID for the UE through an RRC message S181.

The base station transmits a control channel applied for a plurality of subframe sections in the subframe n S182. The control channel can be the PDCCH, and the PDCCH can include scheduling information about one or two or more PDSCHs with respect to the plurality of subframe sections as shown in FIG. 8.

The UE decodes a control channel S183.

The base station transmits a data channel from a subframe n+m, which is a subframe within the plurality of subframe sections S184. The data channel can be a PDSCH.

The UE, based on the CFID previously received from the subframe n+m, identifies the starting position of the data channel and decodes the data channel S185.

The CFID specified by an RRC message can be a value commonly applied for all of the subframes within the plurality of subframes. In this case, the CFID value included in the RRC message can assume one value. In case scheduling is performed by using an ePDCCH, the same value as the RRC value specified for the starting position of the ePDCCH can be applied to the CFID value.

Similarly, the CFID value specified by the RRC message can be given as an independent value according to characteristics of a subframe within the plurality of subframe sections. For example, in a plurality of subframe sections, a Multicast/Broadcast Single Frequency Network (MBSFN) subframe and a normal subframe can be included together. In this case, an independent CFID value can be applied according to whether a subframe including the PDSCH is an MBSFN subframe or a normal subframe.

In other case, depending on whether a subframe is an ABS subframe or a normal subframe, the CFID value can be applied. Also, a subframe is distinguished according to the amount of interference of a neighboring cell, and the CFID value can be applied accordingly. In other words, the CFID value applied in the serving cell is varied according to whether the subframe of a neighboring cell is an ABS subframe or a normal subframe.

Also, a time period to which a CFID value included in an RRC message is applied can be determined. The time period may be one frame or multiple frames. In other words, a pattern, based on which the starting position of the PDSCH is determined with respect to one or multiple frames, can be informed. The pattern can be provided in a form of index which designates any one of a plurality of predefined patterns.

II. Method 2: A Wireless Communication System can Use a CFID Having a Predefined, Fixed Value.

For example, this method uses a CFID value which takes account of the maximum number of OFDM symbols indicating existence of the PDCCH depending on characteristics of a subframe. The maximum number of OFDM symbols indicating existence of the PDCCH in the LTE system is defined by the initial four OFDM symbols within a subframe. Therefore, independently of how many OFDM symbols are involved to form an actual PDCCH, it is always assumed that the PDSCH starts from the fifth OFDM symbol. Similarly, if the maximum number of OFDM symbols indicating existence of the PDCCH in a given frequency band is 3, it can be assumed that the PDSCH starts from the fourth OFDM symbol.

Since the PDCCH may not present in an ABS frame, the CFID can be set from the first OFDM symbol. In other case, the CFID can be set from the second OFDM symbol by considering the minimum value of CFI, 1.

III. Method 3: The Base Station can Command a CFID Value on the PDCCH.

For example, the base station can transmit the CFID value by incorporating it into the DCI transmitted through the PDCCH.

In the case of bundled scheduling, one CFID value can be assigned to the whole or a group (subframe 0 to 2 of FIG. 8(a)) of scheduled subframes, or the CFID value can be assigned independently to each subframe.

In the case of cross subframe scheduling, the CFID value can be defined for a subframe to which the PDSCH is transmitted.

IV. Method 4: The PCFICH Value in a Subframe to which the PDCCH has been Transmitted is Used as it is.

The CFI value detected through the PCFICH in a subframe from which the PDCCH is transmitted is applied the same to the subframes in a plurality of subframe sections. For example, the CFI value of the PCFICH detected at subframe 0 of FIG. 8(a) is applied the same to the subframe 1 and 2. When this method is employed, the base station may be restricted such that the CFI values of the subframe 1 and 2 need to be set the same as the CFI value of the subframe 0.

In case the PDCCH and the PDSCH belong to the same subframe when the methods above are employed, the CFI value received through the PCFICH is applied, and a combination of the above methods can be used for other cases.

In other words, in case the PDSCH is scheduled in a plurality of time periods by using one PDCCH; and the PDCCH and PDSCH belong to the same subframe, the starting position of the PDSCH is identified by the PCFICH as done in a conventional method, but for the remaining subframes excluding the same subframe from among the plurality of time periods, a method for identifying the starting position of the PDSCH according to the present invention can be used.

The above method can be applied the same to the case of scheduling by using an ePDCCH. However, in case the starting position of an OFDM symbol of the ePDCCH does not rely on the PCFICH, it is more preferable not to use the above method.

Also, in case scheduling is performed by using the ePDCCH, the starting position of the PDSCH transmitted to the same subframe as the one to which the ePDCCH is transmitted can use the same value as the starting position of the ePDCCH.

Also, selection of methods I to IV described above can be signaled by the base station. For example, the base station can specify through RRC signaling that a method using the PCFICH and a method for using a predefined starting position are applied selectively. Also, the present invention can be applied to the case of a scheduled PDSCH or a Random Access Response (RAR). For example, in the case of a PDSCH which is set periodically without the corresponding PDCCH as an SPS is applied, using the PCFICH may become unstable if a method for reducing inter-cell interference in units of subframes in a heterogeneous network is used. Therefore, the starting position of a PDSCH in a subframe which includes the PDCCH activating/deactivating the SPS is set based on the PCFICH, and the method I or II described above can be applied only to the case of a PDSCH without the corresponding PDCCH.

Also, the present invention can be applied to the case where a scheduling PDCCH and a scheduled PDSCH are present in a different CC respectively or to the case of the PDSCH without a scheduling PDCCH.

According to the present invention, since the starting position of the PDSCH is correctly recognized, decoding performance of the PDSCH can be improved and unnecessary re-transmission can be reduced. As a result, system performance can be enhanced.

In the previous description, it is assumed that the PDCCH corresponds to the control channel, but the present invention is not limited to the assumption. In other words, a wireless communication system can apply the present invention to the case where the ePDCCH is used as the control channel; or the PDCCH and the ePDCCH are used jointly.

Subframes where the ePDCCH is transmitted can be configured continuously or discontinuously. That is, the UE has to detect the ePDCCH in continuous subframes or in discontinuous subframes.

In case bundled scheduling through the ePDCCH is used, a target of bundled scheduling by the UE can be limited to DL subframes searching for the ePDCCH excluding the DL subframes which do not perform a search for the ePDCCH.

For example, suppose data channels of a total of four subframes are scheduled (bundled scheduling) through one ePDCCH. In this case, the one ePDCCH can include information notifying that the number of subframes which are a target of bundled scheduling is four. At this time, the four denotes 1) four subframes searched by the UE for the ePDCCH or 2) four subframes from a subframe including the one ePDCCH.

In the case of 1), subframes not searched by the UE for the ePDCCH are skipped and thus a total of four subframes are scheduled. On the other hand, in the case of 2), if there is one subframe not searched for the ePDCCH from among four subframes starting from a subframe including the one ePDCCH, the subframe is excluded and only the remaining three subframes are scheduled.

In case cross-subframe scheduling is carried out through the ePDCCH, a subframe not searched for the ePDCCH (or a subframe searched for the PDCCH) is skipped and not considered for scheduling. Now suppose that the number of subframes scheduled by the ePDCCH is 1 and a scheduled subframe is a subframe with a subframe offset of 4 from the subframe including the ePDCCH. Then the subframe offset 4 can imply the position after four subframes searched by the UE for the ePDCCH or the position after four subframes determined independently of whether the subframes are those searched by the UE for the ePDCCH.

Figure 10:
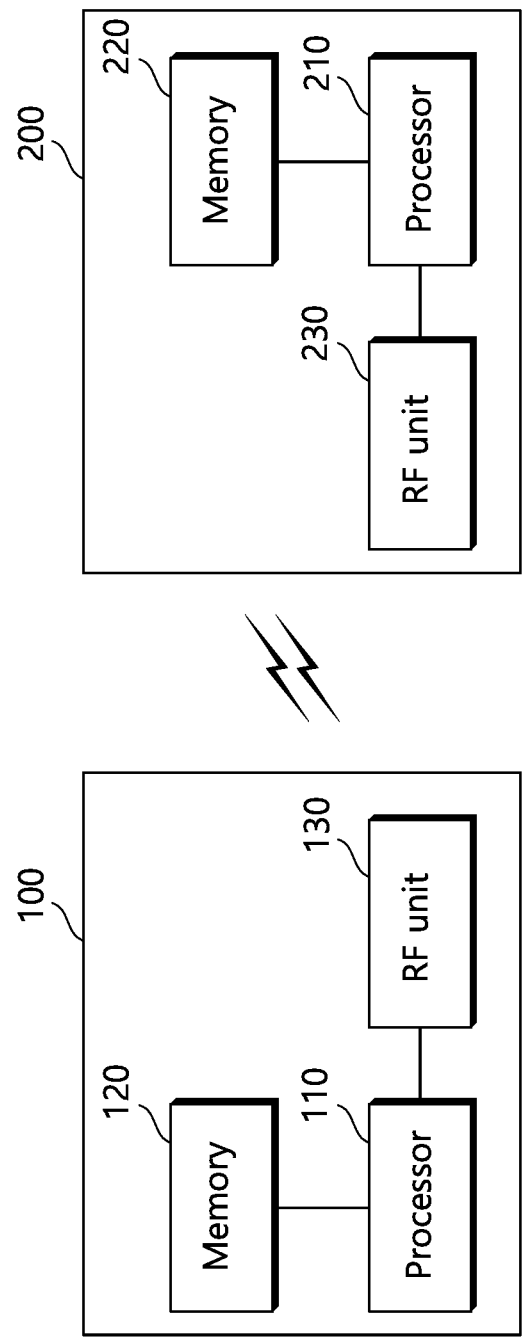
FIG. 10 illustrates a structure of a base station and a UE according to an embodiment of the present invention.

FIG. 10 illustrates a structure of a base station and a UE according to an embodiment of the present invention.

The base station 100 comprises a processor 110, a memory 120, and a Radio Frequency (RF) unit 130. The processor 110 implements a proposed function, procedure and/or method. For example, the processor 110 informs the UE about starting positions of data channels located in a plurality of subframes. The methods 1 to 4 can be used as specific implementation thereof. Also, the processor 110 transmits to the UE a control channel and at least one data channel scheduled by the control channel. The memory 120, being connected to the processor 110, stores various kinds of information for driving the processor 110. The RF unit 130, being connected to the processor 110, transmits and/or receives a radio signal.

The UE 200 comprises a processor 210, a memory 220, and an RF unit 230. The processor 210 implements a proposed function, procedure and/or method. For example, the processor 210 receives position information informing about the starting positions of data channels in a plurality of subframes and receives a control channel from a downlink subframe. And the processor 210 receives at least one data channel scheduled by the control channel among a plurality of downlink subframes. At this time, the starting position of a data channel within the plurality of downlink subframes can be determined based on the position information. The memory 220, being connected to the processor 210, stores various kinds of information for driving the processor 210. The RF unit 230, being connected to the processor 210, transmits and/or receives a radio signal.

The processor 110, 210 can include Application-Specific Integrated Circuit (ASIC), other chipsets, logical circuits, data processing apparatus and/or a converter converting a baseband signal to a radio signal and vice versa. The memory 120, 220 can include ROM (Read-Only Memory), RAM (Random Access Memory), flash memory, memory card, storage medium, and/or other storage apparatus. The RF unit 130, 230 can include one or more antennas transmitting and/or receiving a radio signal. In case an embodiment is implemented in the form of software, the method described in this document can be implemented in the form of a module (procedure, function, and the like) carrying out the aforementioned functions. The module can be stored in the memory 120, 220 and executed by the processor 110, 210. The memory 120, 220 can be implemented inside or outside the processor 110, 210 and can be connected to the processor 110, 210 through various other means well-known to the public.

So far, the present invention has been described with reference to embodiments; however, it should be understood by those skilled in the art that the present invention can be revised and modified in various ways without departing from the technical principles and scope of the present invention. Therefore, it should be noted that the present invention is not limited to the embodiments described in this document but includes all of the embodiments that can be defined by the appended claims of this document.

What is claimed is:

1. A method for receiving a physical downlink shared channel (PDSCH), the method performed by a user equipment (UE) and comprising:
   receiving first position information and second position information via a radio resource control (RRC) layer;
   receiving a control format indication (CFI) via a physical layer,
   wherein each of the first position information, the second position information and CFI is information related to a starting orthogonal frequency division multiplexing (OFDM) symbol for the PDSCH,
   monitoring a downlink control channel on a same serving cell of the PDSCH based on the first position information,
   receiving the PDSCH and the downlink control channel on different serving cells based on the second position information,
   receiving the PDSCH assigned by the downlink control channel in a subframe based on the CFI,
   wherein the downlink control channel is a channel based on the physical layer; and
   receiving the PDSCH in the subframe based on the starting OFDM symbol,
   wherein, in the subframe, when the PDSCH is assigned by the downlink control channel, the UE determines the starting OFDM symbol for the PDSCH based on the CFI,
   wherein, when the UE is configured to monitor the downlink control channel on a same serving cell of the PDSCH and the PDSCH is not assigned by the downlink control channel in the subframe, the UE determines the starting OFDM symbol for the PDSCH based on the first position information instead of the CFI, and
   wherein, when the PDSCH and the downlink control channel are received on different serving cells, the UE determines the starting OFDM symbol for the PDSCH based on the second position information.

2. The method of claim 1, wherein the subframe is a subframe in which the UE is configured to monitor an enhanced physical downlink control channel (E-PDCCH).

3. The method of claim 1, the CFI indicates a number of OFDM symbols used for the downlink control channel.

4. A User Equipment (UE) for receiving a physical downlink shared channel (PDSCH), the UE comprising:
   a transmitter and receiver; and
   a processor, operatively connected to the transmitter and receiver, that:
   controls the receiver to receive first position information and second position information via a radio resource control (RRC) layer;
   controls the receiver to receive a control format indication (CFI) via a physical layer,
   wherein each of the first position information, the second position information and CFI is information related to a starting orthogonal frequency division multiplexing (OFDM) symbol for the PDSCH, monitors a downlink control channel on a same serving cell of the PDSCH based on the first position information, receives the PDSCH and the downlink control channel on different serving cells based on the second position information, receives the PDSCH assigned by the downlink control channel in a subframe based on the CFI, wherein the downlink control channel is a channel based on the physical layer; and controls the receiver to receive the PDSCH in the subframe based on the starting OFDM symbol, wherein, in the subframe, when the PDSCH is assigned by the downlink control channel, the UE determines the starting OFDM symbol for the PDSCH based on the CFI, wherein, when the UE is configured to monitor the downlink control channel on a same serving cell of the PDSCH and the PDSCH is not assigned by the downlink control channel in the subframe, the UE determines the starting OFDM symbol for the PDSCH based on the first position information instead of the CFI, and wherein, when the PDSCH and the downlink control channel are received on different serving cells, the UE determines the starting OFDM symbol for the PDSCH based on the second position information.

5. The UE of claim 4, wherein the subframe is a subframe in which the UE is configured to monitor an enhanced physical downlink control channel (E-PDCCH).

6. The UE of claim 4, the CFI indicates a number of OFDM symbols used for the downlink control channel.

* * * * *